US012736480B2

(12) United States Patent
Lin et al.

(10) Patent No.: US 12,736,480 B2
(45) Date of Patent: Sep. 15, 2026

(54) DEFECT INSPECTION METHOD AND DEFECT INSPECTION SYSTEM

(71) Applicant: TAIWAN SEMICONDUCTOR MANUFACTURING COMPANY LTD., Hsinchu (TW)

(72) Inventors: Ching-Yi Lin, Yilan County (TW); To-Yu Chen, Yunlin County (TW); Shao-Chien Chiu, Hsinchu City (TW); Ting-Han Lin, Hsinchu City (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 476 days.

(21) Appl. No.: 18/356,193

(22) Filed: Jul. 20, 2023

(65) Prior Publication Data

US 2025/0027886 A1 Jan. 23, 2025

(51) Int. Cl.

| | |
|---|---|
| ***G06K 9/00*** | (2022.01) |
| ***G01N 21/88*** | (2006.01) |
| ***G01N 21/95*** | (2006.01) |
| ***G01N 21/956*** | (2006.01) |
| ***G06T 7/00*** | (2017.01) |

(52) U.S. Cl.

CPC ... *G01N 21/95607* (2013.01); *G01N 21/8851* (2013.01); *G01N 21/9501* (2013.01); *G06T 7/001* (2013.01); *G01N 2021/8887* (2013.01); *G01N 2021/95615* (2013.01); *G06T 2207/20016* (2013.01); *G06T 2207/20221* (2013.01);

(Continued)

(58) Field of Classification Search

CPC ......... G01N 21/9501; G01N 21/95607; G01N 2021/95615; G01N 21/8851; G01N 2021/8887; G06T 2207/30148; G06T 7/001; G06T 2207/30168; G06T 7/0002; G06T 2207/20221

See application file for complete search history.

(56) References Cited

U.S. PATENT DOCUMENTS 8,355,559 B2 * 1/2013 Harada ................. G06T 7/0004 382/141
2016/0314578 A1 * 10/2016 Banerjee ................. G06T 7/001

(Continued)

*Primary Examiner* — Gregory A Morse
*Assistant Examiner* — Kevin M Coomber
(74) *Attorney, Agent, or Firm* — WPAT LAW; Anthony King

(57) ABSTRACT

A defect inspection method, an inspection system, and a non-transitory computer-readable storage medium are provided. The defect inspection method includes providing a processed image and a reference image of a wafer, both the processed image and the reference image comprising a pattern of interest; determining the processed image as a qualified image in response to a matching ratio that reflects a percentage of correctly aligned features of the pattern of interest between the processed image and the reference image is above a first predetermined threshold; selecting a first feature of the qualified image; selecting a second feature of the reference image corresponding to the first feature of the processed image; comparing the qualified image with the reference image to determine a variation of the first feature with respect to the second feature; and detecting a defect of the wafer based on a comparison of the first and second features.

20 Claims, 19 Drawing Sheets

(52) U.S. Cl.
CPC ............... *G06T 2207/30148* (2013.01); *G06T 2207/30168* (2013.01)

(56) References Cited

U.S. PATENT DOCUMENTS

| | | | | |
|---|---|---|---|---|
| 2017/0212168 | A1* | 7/2017 | Leu | G01R 31/31703 |
| 2020/0334800 | A1* | 10/2020 | Chou | G06V 10/82 |
| 2023/0238290 | A1* | 7/2023 | Kondo | G01N 21/9501 438/14 |
| 2024/0193798 | A1* | 6/2024 | Jiang | G06T 7/344 |

* cited by examiner

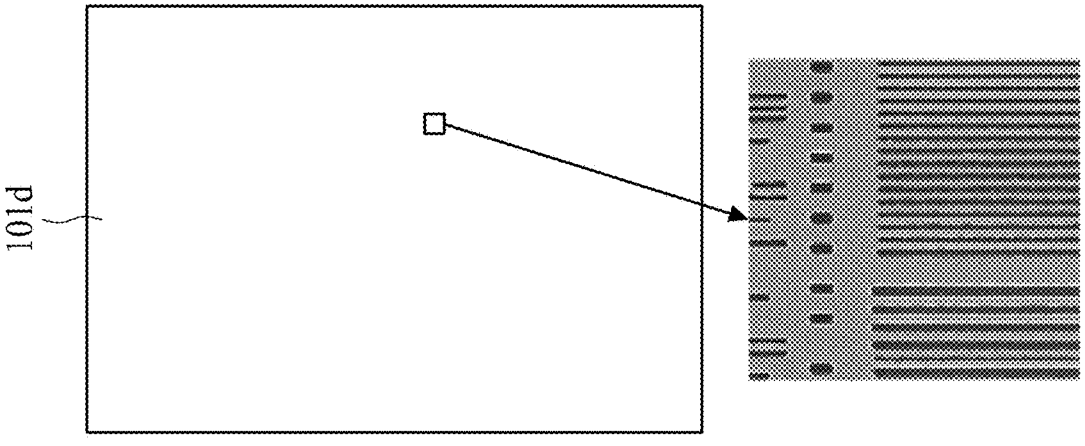
FIG. 2B
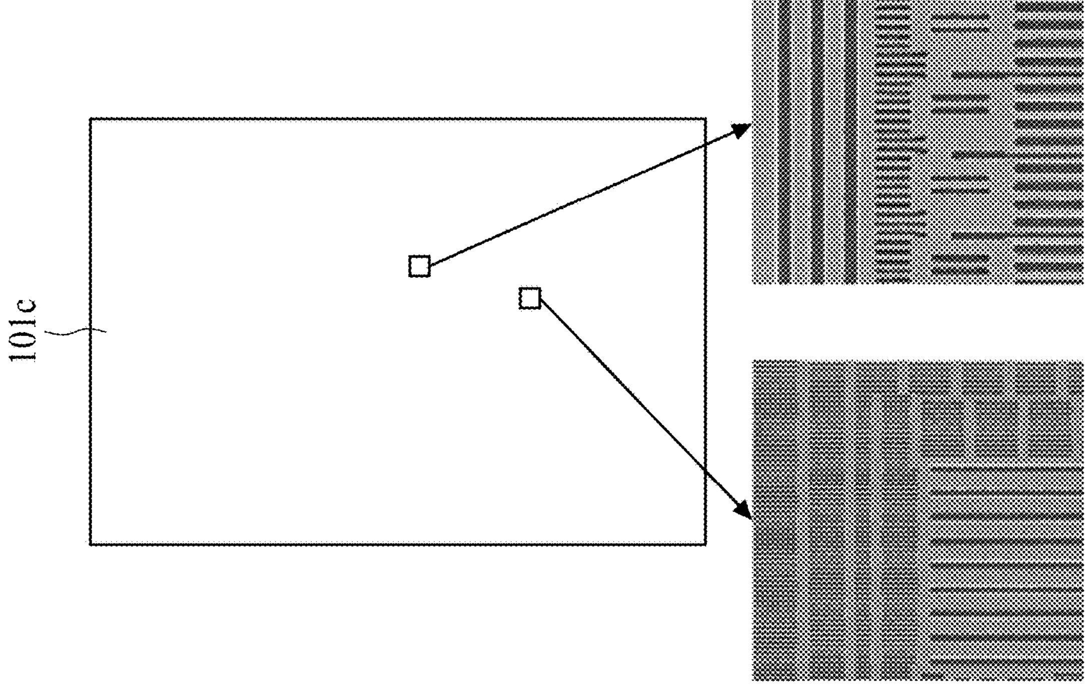

901
902

DEFECT INSPECTION METHOD AND DEFECT INSPECTION SYSTEM

BACKGROUND

As technologies evolve, design and manufacturing of semiconductor devices become more complicated in view of smaller dimensions, increased functionality and more complicated circuitries. Numerous manufacturing operations are implemented within such small and high-performance semiconductor devices. To enhance quality, reliability, and yield of the semiconductor devices, inspection processes are used at various steps during the manufacturing of the semiconductor devices to identify defect(s) present on a wafer. In general, the inspections are manually performed by on-site technicians. In such inspections, the on-site technicians visually check optical images of target feature(s) formed on the wafer to determine the presence of defect(s) such as, parametric (e.g., line width), random, and area-dependent failures. However, there is a possibility of causing human errors including erroneous reading of the optical images due to a heavy load on the on-site technicians.

Accordingly, it would be advantageous to develop machine-based inspection to reduce human errors and enhance work efficiency.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, dimensions of the various structures may be arbitrarily increased or reduced for clarity of discussion.

FIG. 2B is a schematic diagram illustrating non-repeating defects in accordance with some embodiments of the present disclosure.

DETAILED DESCRIPTION

Figure 1:
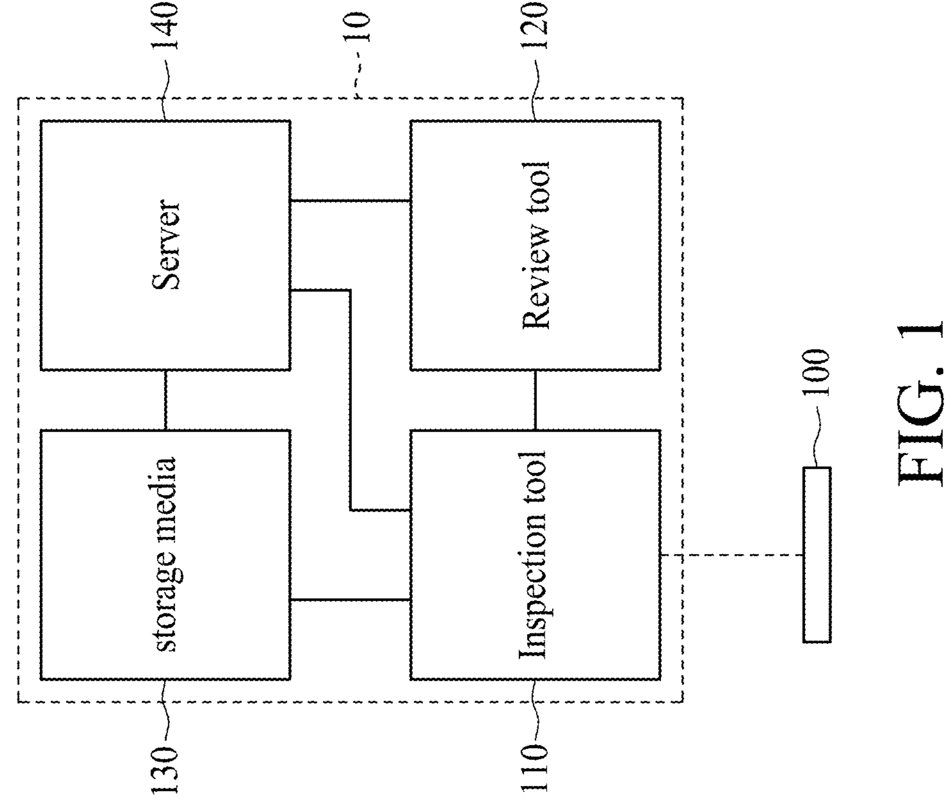
FIG. 1 is a schematic diagram of an inspection system in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “over,” “upper,” “on,” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Figure 2A:
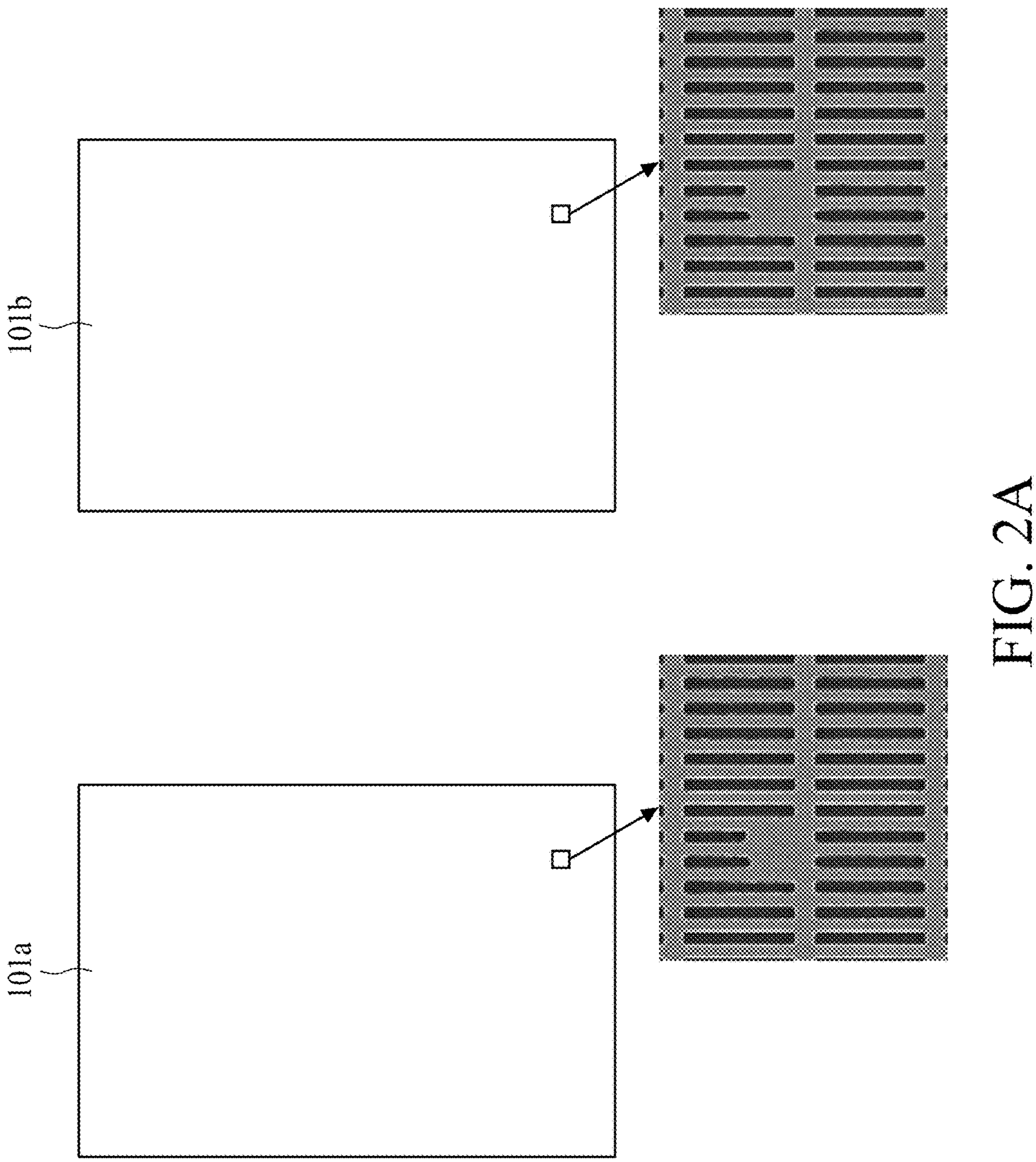
FIG. 2A is a schematic diagram illustrating repeating defects in accordance with some embodiments of the present disclosure.

The miniaturization of semiconductor devices is continuing at an extraordinary rate. In order to accurately develop, characterize, and test these devices, advanced imaging and analysis techniques are needed. As a part of the IC fabrication process, wafers may be undergo inspection to identify potential defects. Referring now to FIG. 1, which is a schematic diagram of an inspection system 10 in accordance with some embodiments of the present disclosure. The inspection system 10 is configured to identify defect(s) on a wafer 100 or a reticle, based on inspection images generated by inspection of the wafer 100. Generally, the wafer 100 may include a plurality of die areas having repeatable patterned features, and during the formation of the patterned features, defects may be formed on the die areas. Such defects may be repeated across multiple dies, such as first die 101*a* and second die 101*b*, formed on the wafer 100 (as shown in FIG. 2A) or may be found randomly on a wafer surface (as shown in FIG. 2B). Referring to FIG. 2A, detects that appear at substantially the same positions across the first and second dies 101*a* and 101*b* formed on a wafer can be identified as repeating defects. The repeating defects may, for example, be systematically caused by defects found on the reticle used to print one or more of the patterned features on the wafer in a lithography process. Referring to FIG. 2B, defects that do not appear at substantially the same position across different multiple dies (such as a third die 101*c* and the fourth die 101*d*) formed on a wafer may be identified as random defects. The random defects, such as a film thickness variation or a lateral dimension variation, may be formed due to individual process variations and/or interactions of multiple processes.

Referring again to FIG. 1, the inspection system 10 includes an inspection tool 110 and a review tool 120 electrically coupled to the inspection tool 110. The inspection tool 110 is configured to image the wafer 100 and generate inspection images of the wafer 100. Specifically, the inspection tool 110 can perform die-to-die inspection on a region of a wafer with a small number of repetitive patterns and generate inspection images of the region with the repetitive patterns. The repetitive pattern is, for example, a contact-hole pattern or a line-and-space pattern, including a function element to be imprinted to the wafer 100 via a resist film. In some embodiments, the area to be inspected on the wafer is 100 generally scanned swath by swath, until the inspection images have been generated for the entire inspection area.

Figure 3B:
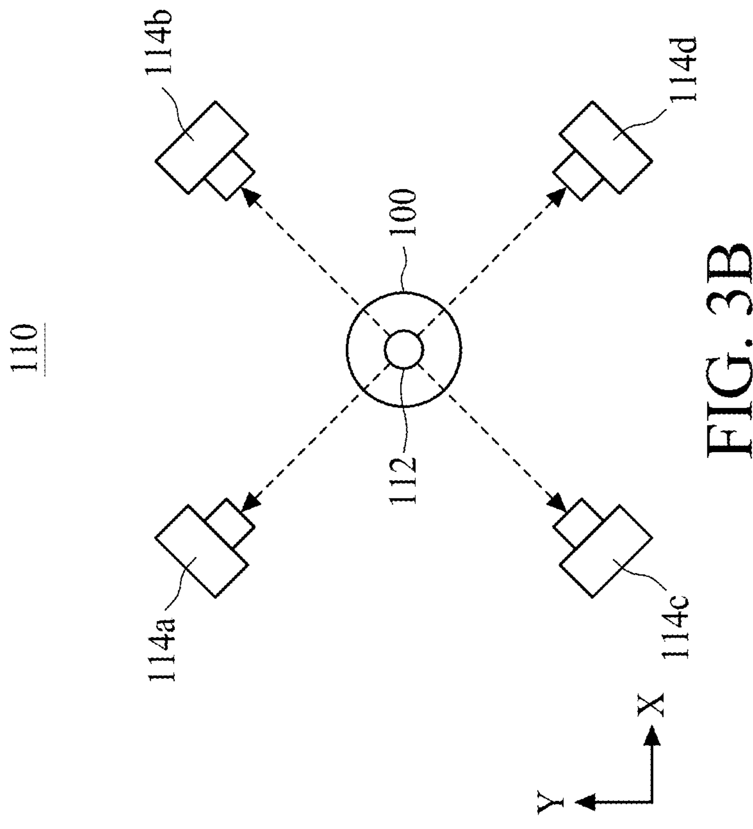
FIG. 3B is a top view of the inspection tool in accordance with some embodiments of the present disclosure.
Figure 3A:
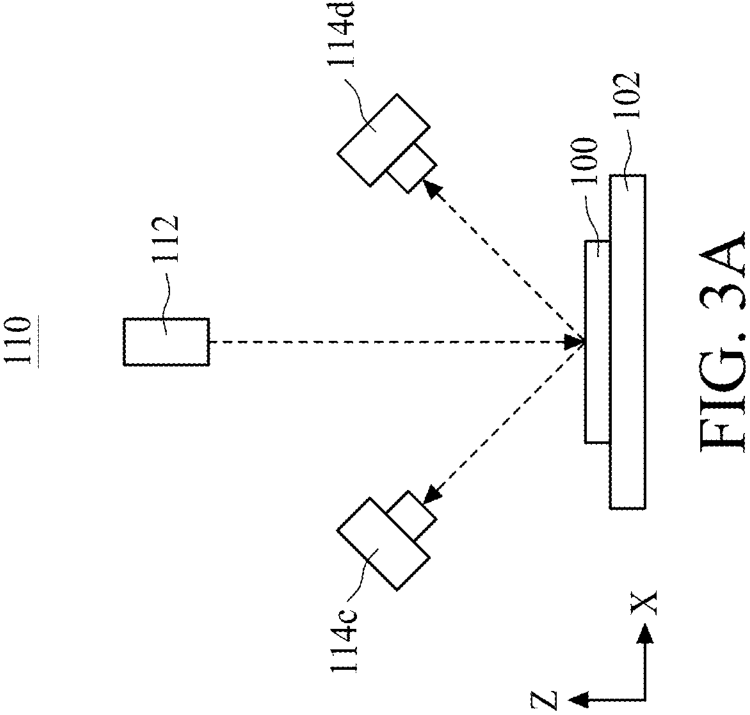
FIG. 3A is a schematic diagram illustrating an inspection tool in accordance with some embodiments of the present disclosure.

One embodiment of such inspection tool 110 is shown in FIGS. 3A and 3B. Referring to FIGS. 3A and 3B, the inspection tool 110 includes an energy source 112 and a plurality of detectors 114*a*, 114*b*, 114*c*, and 114*d*. The energy source 112 is configured to generate an energy beam that is directed to the wafer 100, and the detectors 114*a*, 114*b*, 114*c*, and 114*d* are configured to detect the scattered energy beam and reflected energy beam from the wafer 100 and to generate an output responsive to the detected energy beam. The wafer 100 is mounted on a movable platform, such as a motion stage 102, so as to enable the wafer 100 to be translated and/or rotated with respect to the energy source 110 and the detectors 114*a*, 114*b*, 114*c*, and 114*d*.

In some embodiments, the energy source 112 emits an energy beam onto a small region with a pattern of interest on the surface of the wafer 100. In some embodiments, the energy beam emitted from the energy source 112 is directed to the wafer 100 at a normal angle of incidence. However, the angle of incidence may include any suitable angle of incidence, which may vary depending on, for instance, characteristics of the wafer 100 and the defects to be detected on the wafer 100. In some embodiments, the energy beam directed to the wafer 100 includes electrons, and the energy beam detected from the wafer 100 includes electrons. In this manner, the energy source 112 may be an electron beam source, and the inspection tool 110 may be a scanning electron microscope (SEM) tool.

The detectors 114*a*, 114*b*, 114*c*, and 114*d* are configured to detect the energy beam (e.g., formed of electrons) that is scattered at different angles from the wafer 100, and inspection images are generated from the detected electrons. In addition, the detectors 114*a*, 114*b*, 114*c*, and 114*d* may further be configured to detect another type of energy from the wafer 100 (e.g., reflected energy). Specifically, the detectors 114*a*, 114*b*, 114*c*, and 114*d* are arranged around the region having the patterns of interest and angled toward the region. Each of the detectors 114*a*, 114*b*, 114*c*, and 114*d* may have the same configuration and include a two-dimensional sensor, such as a complementary metal-oxide-semiconductor (CMOS) or a charge coupled device (CCD). The detectors 114*a*, 114*b*, 114*c*, and 114*d* may conduct detection simultaneously or sequentially.

Figure 4:
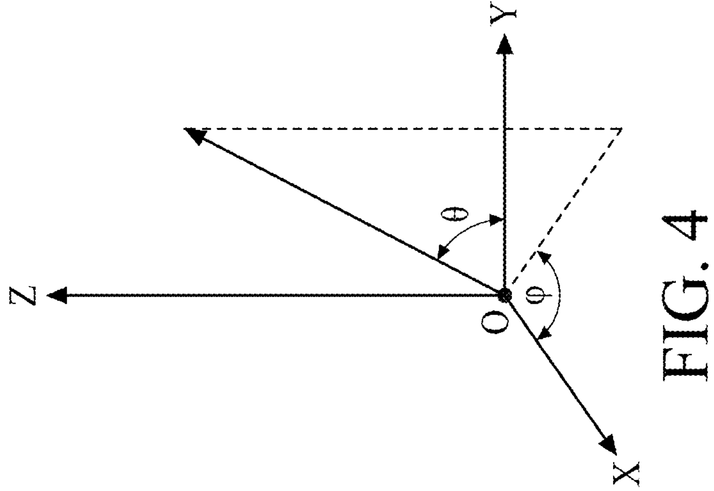
FIG. 4 is a diagram depicting a conventional definition of angles.

In the case where the angular characteristics of the scattered energy may change its transmission path due to the size and shape of a defect, a film type on the wafer 100, and surface roughness, the inspection can be performed by using the detectors 114*a*, 114*b*, 114*c*, and 114*d* arranged at different angles to obtain the angular characteristics of the scattered energy from the wafer 100. Turning to FIG. 3B, the detectors 114*a*, 114*b*, 114*c*, and 114*d* are oriented in different azimuthal angles with respect to the wafer 100. The azimuthal angle (denoted by φ) in relation to the pattern of interest on the wafer 100 is shown as illustrated in FIG. 4, wherein the location of the pattern of interest is at an reference point denoted by O. Referring again to FIG. 3B, in some embodiments, the detectors 114*a*, 114*b*, 114*c*, and 114*d* are positioned at an azimuthal angle of 90 degrees apart from each other. In this way, almost all of the scattered energy from the wafer 100 is able to be detected. Regarding arrangement of the detectors, although an example is shown in FIG. 3B where four detectors are arranged in different azimuthal angles, the number of the detectors does not necessarily need to be four and the azimuthal angles in which they are arranged are not limited to 90 degrees.

The inspection images having different visual fields are not suitable for processing for the purpose of defect detection, as will be described below, so the inspection images are desirably obtained with the equal view angles. Therefore, for example, the detectors 114*a*, 114*b*, 114*c*, and 114*d* should be arranged at substantially equal elevation angles (about 45 degrees in this embodiment), wherein the elevation angle (denoted by θ) in relation to the pattern of interest on the wafer 100 is shown as illustrated in FIG. 4. With such configuration, the detectors 114*a*, 114*b*, 114*c*, and 114*d* may have substantially equal ranges of the visual field, and sizes of the pattern of interest displayed in the inspection images can be are made substantially equal. The range of the visual field means an actual size of the region of interest which is scanned, e.g., by the electron beam emitted from the energy source 112.

Figure 5B:
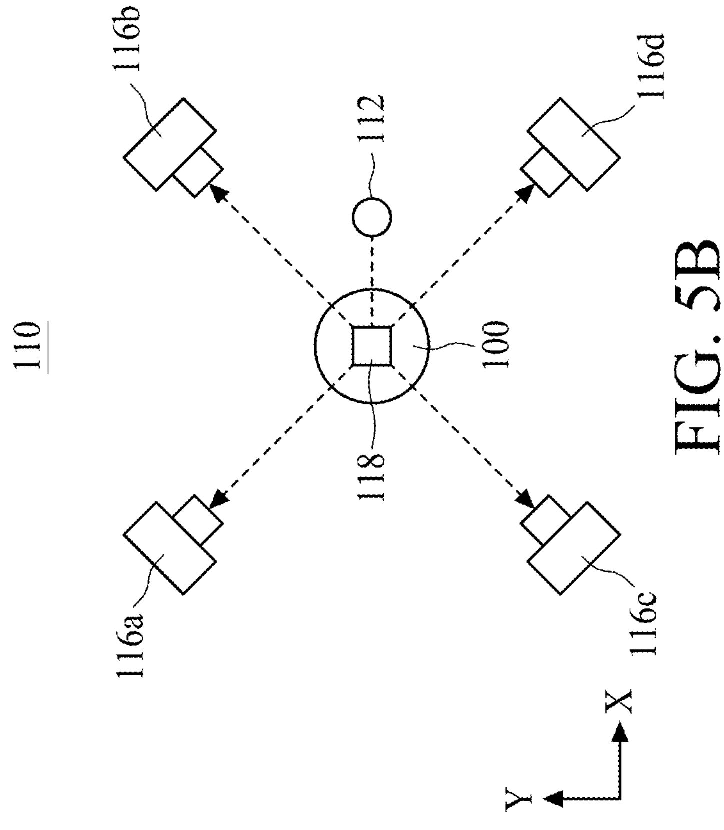
FIG. 5B is a top view of the inspection tool in accordance with some embodiments of the present disclosure.
Figure 5A:
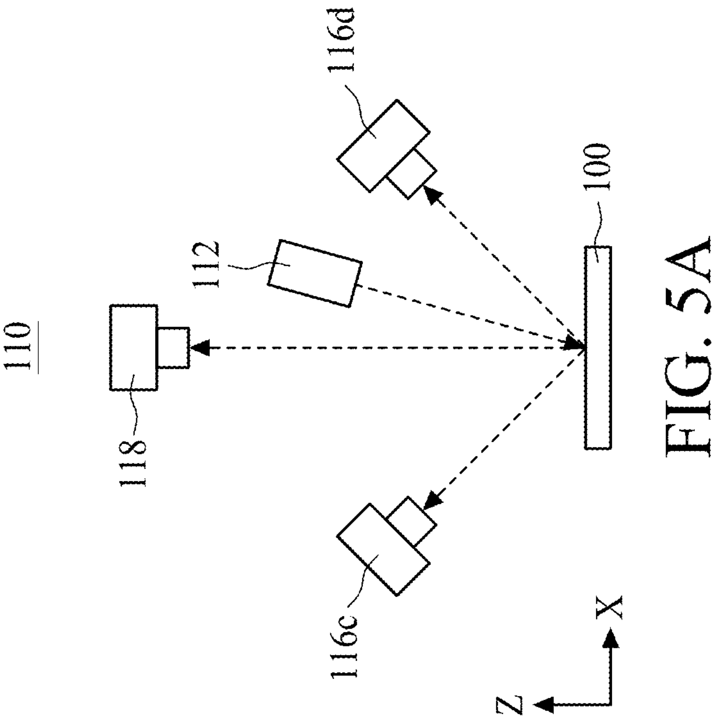
FIG. 5A is a schematic diagram illustrating an inspection tool in accordance with some embodiments of the present disclosure.

In some embodiments, the inspection tool 110 shown in FIGS. 3A and 3B has a sufficient resolution to detect such defects of the contact-hole pattern. However, the inspection tool 110 shown in FIGS. 3A and 3B is not sensitive to the defect of the line-and-space pattern. As such, another embodiment of such inspection tool 110 is shown in FIGS. 5A and 5B. In FIGS. 5A and 5B, the inspection tool 110 includes an energy source 112, a plurality of first detectors 116*a*, 116*b*, 116*c*, and 116*d*, and a second detector 118. The energy source 112 is configured to generate an energy beam and direct the energy beam to the wafer 100 at a first azimuthal angle and a first elevation angle. The first elevation angle may include any suitable angle, which may vary depending on, for instance, characteristics of the defects to be detected on the wafer 100.

The first detectors 116*a*, 116*b*, 116*c*, and 116*d* are configured to detect the energy reflected and scattered from the wafer 100 at a second elevation angle, and the second detector 118 is configured to detect the energy reflected and scattered from the wafer 100 at a third elevation angle. In some embodiments, the second elevation angle is less than the third elevation angle (about 90 degrees in this embodiment), and the first elevation angle is between the second and third elevation angles. The first detectors 116*a*, 116*b*, 116*c*, and 116*d* are arranged around the wafer 100 at equal elevations and at azimuthal angles 90 degrees spaced apart from each other. Therefore, each of the first detectors 116*a*, 116*b*, 116*c*, and 116*d* may be referred to as a "side view" detector. The second detector 118 is configured to detect the energy at scatted angle(s) that is substantially normal to the wafer surface. The second detector 118 may therefore be referred to as a "top view" detector. The first detectors 116*a*, 116*b*, 116*c*, and 116*d* and the second detector 118 may conduct energy detection simultaneously or sequentially, and inspection images generated by these detectors can be fed to the review tool 120 and/or a storage media 130 and/or a server 140 shown in FIG. 1.

Referring again to FIG. 1, the review tool 120 is configured to observe and categorize the defects present on the wafer 100 based on the inspection images generated by the inspection tool 110. In some embodiments, the defect review may include metrology to measure one or more characteristics of pattern features on the wafer 100, such as a dimension (e.g., line width, hole area). In other embodiments, the defect review may include identifying particulate contamination on the wafer 100.

In some embodiments, the inspection system 10 further includes the storage media 130 configured to store the inspection images for the wafer 100 generated by the inspection tool 110. The storage media 130 is electrically coupled to the inspection tool 110 and the review tool 120. In some embodiments, the detected defects are stored in the storage medium 130, and the review tool 120 may be configured to identify the defects that are the repeating defects using all of the stored detected defects for the entire inspection area of the wafer 100. In some embodiments, the inspection system 10 also includes the server 140 electrically coupled to the inspection tool 110, the review tool 120, and the storage media 130.

Figure 6:
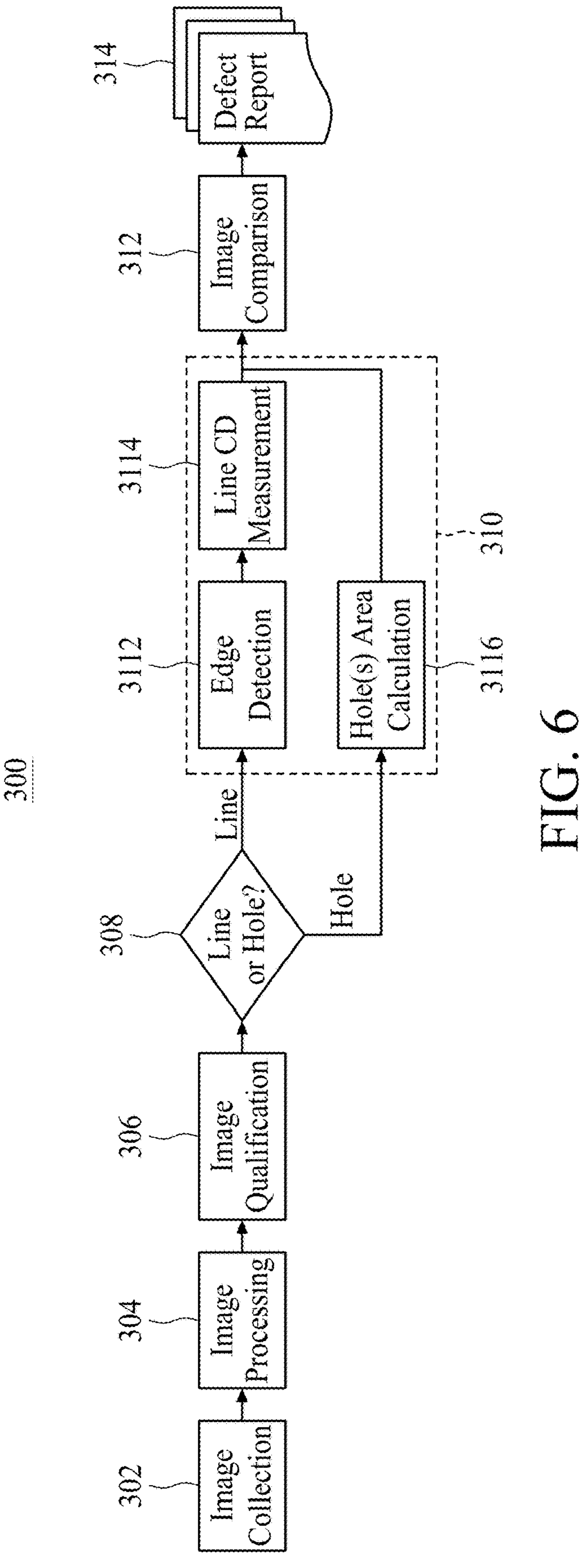
FIG. 6 is a flow chart of a method for inspecting defects in accordance with some embodiments of the present disclosure.

Referring now to FIG. 6, which is a flow chart of a method 300 for detecting defects in accordance with some embodiments of the present disclosure. The method 300 may be executed by the review tool 120 shown in FIG. 1. The method 300 includes collecting a plurality of inspection images at block 302, processing the inspection images to produce a processed image at block 304, determining whether the processed image is qualified at block 306, classifying the qualified image at block 308, analyzing patterns of the qualified image and the reference image at block 310, comparing the qualified image with the reference image at block 312, and reporting comparison result at block 314.

Figure 7:
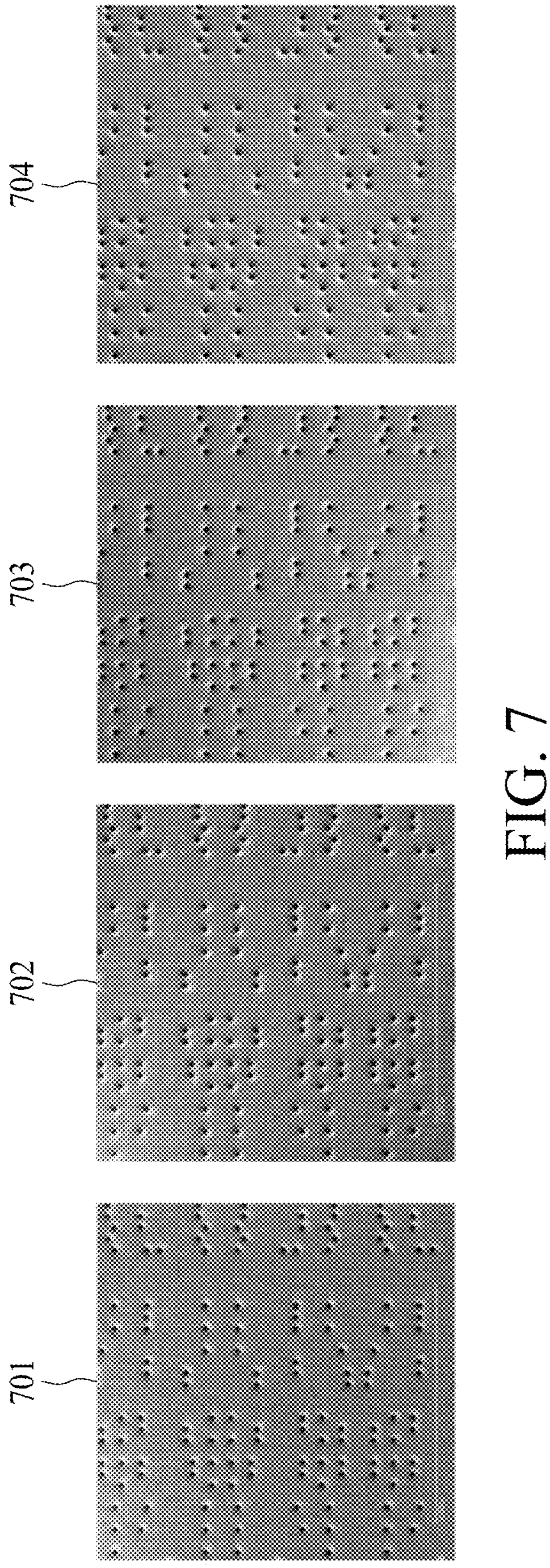
FIG. 7 depicts inspection images obtained by a SEM-type inspection tool in accordance with some embodiments of the present disclosure.

At block 302, the inspection images may be generated from the same inspection system or from different inspection systems when any one inspection system is not capable of generating all of the images. The inspection images show the pattern of interest on a wafer. The inspection operation of the wafer may be implemented using an inspection tool including an energy source and one or more detectors configured to detect energy scattered and reflected from the wafer. In some embodiments, the inspection of the wafer 100 may be performed by a scanning electron microscopy (SEM). For instance, FIG. 7 shows that inspection images 701, 702, 703, and 704 include various contact-hole patterns.

In some embodiment, the inspection images are generated from the inspection tool 110 or from the storage media 130, as shown in FIG. 1. In some embodiments, the inspection images 701, 702, 703, and 704 are generated by the detectors 104*a*, 104*b*, 104*c*, and 104*d*, respectively. In some embodiments, the inspection images 701, 702, 703, and 704 may be generated sequentially and at least some of the inspection images 701, 702, 703, and 704 may be stored in one or more storage media 130 until all inspection images are available for processing. In other embodiments, the inspection images 701, 702, 703, and 704 may be generated simultaneously, and the inspection images generated by the inspection tool 110 may be fed to the review tool 120.

Figure 8:
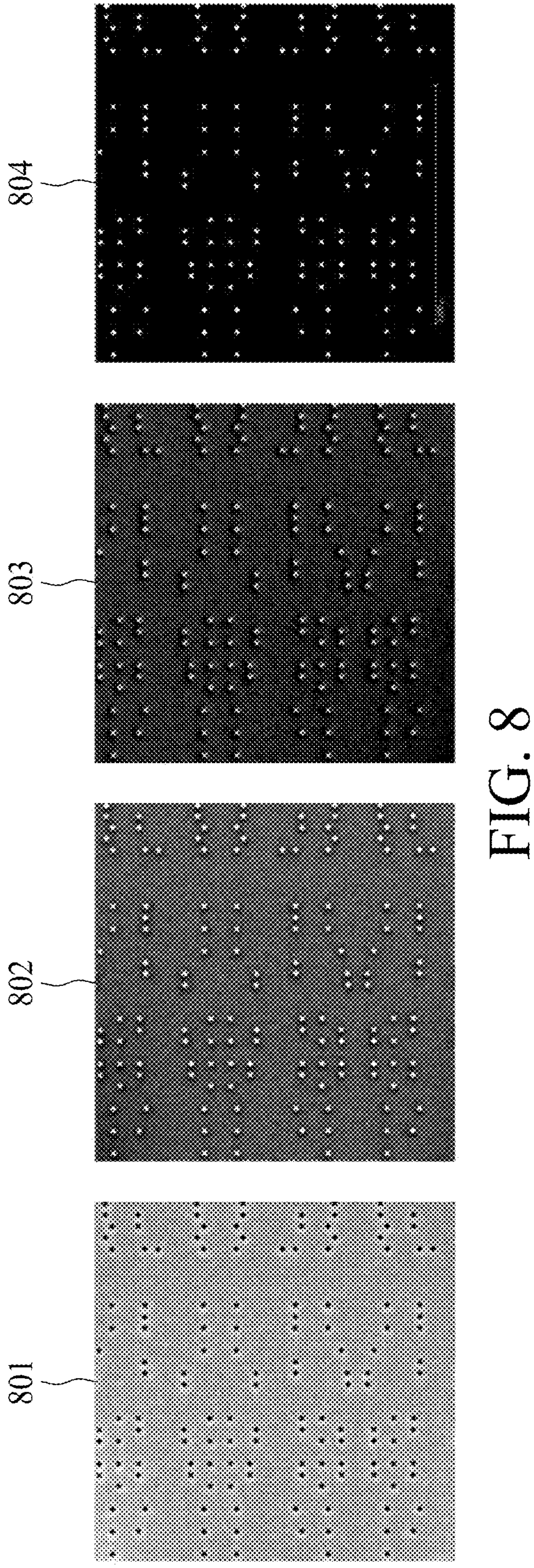
FIG. 8 depicts a merged image, a first enhanced image, a second enhanced image, and a third enhanced image generated by a review tool in accordance with some embodiments of the present disclosure.

At block 304, an image processing algorithm is applied to the inspection images in order to enhance image quality. As shown in FIG. 7, the inspection images 701, 702, 703, and 704 of the contact-hole pattern generated at block 302 may be processed. The server 140 may include one or more processors that implement an image merge technology of the inspection images 701, 702, 703, and 704 for generating a merged image 801 as shown in FIG. 8. A contribution rate indicates the percentage of contribution of each inspection image 701, 702, 703, and 704 for generating the merged image 801. For example, the inspection images 701, 702, 703, and 704 each may have a contribution rate of 0.25 for the merged image 801.

The review tool 120 may also include one or more processors that perform image enhancement on the merged image 801. The processor(s) is configured to optimize the bright/dark contrast of the merged image 801 according to predetermined rules. For example, a contrast-reversing operation is first performed on the merged image 801 to reverse the visual contrast of the merged image 801. Accordingly, a first enhanced image 802 in reversed contrast with the merged image 801 is generated. For example, the portion of the merged image 801 having a contrast level of 100 may become −100 in the first enhanced image 802.

In some embodiments, to generate a clear and sharp image, a brightness-adjusting operation is performed on the first enhanced image 802. In some embodiments, the brightness-adjusting operation may reduce brightness of the first enhanced image 802 to form a relatively dark image, such as a second enhanced image 803 shown in FIG. 8. Such reduction of the brightness may enhance the contrast of the first enhanced image 802.

The degradation of the image quality occurs if the combining operation of contrast reversal and brightness adjustment causes an increase of the image noise that is more influential than the increase of the image contrast, or if such combining operation generates any noise obstructive to the defect detection. Therefore, an image-filtering operation may be optionally performed on the second enhanced image 803 to suppress noise and irrelevant information (such as a portion of image caused by wafer surface roughness) and generate a third enhanced image 804. In some embodiment, the noise in the second enhanced image 803 may be suppressed as the contrast is made greater, and the sharpness level of the contact-hole pattern is increased.

Figure 9:
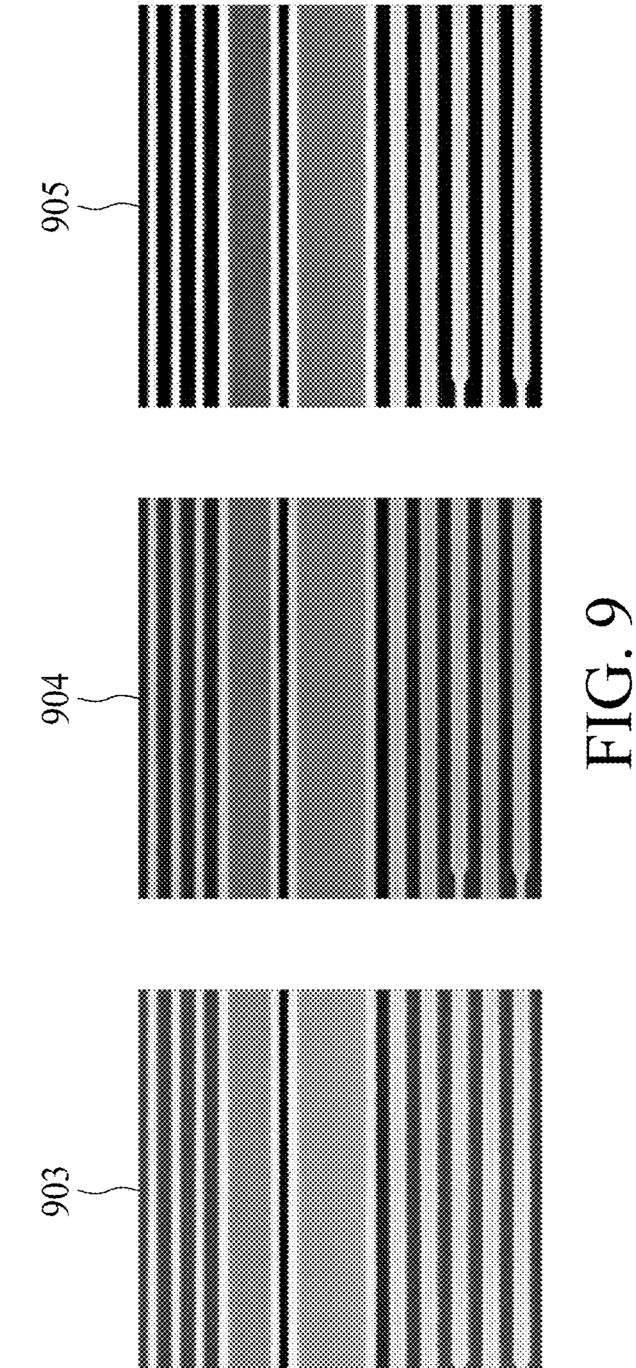
FIG. 9 depicts an inspection image generated by a SEM-type inspection tool, a pre-merged image, a merged image, a first enhanced image, and a second enhanced image generated by a review tool in accordance with some embodiments of the present disclosure.

In some embodiments, when the inspection images generated at block 302 are generated by the inspection tool 110 shown in FIG. 5B. (i.e., the inspection images include the line-and-space pattern), the processor(s) in the server 140 may merge the inspection images generated by the first detectors 106*a*, 106*b*, 106*c*, and 106*d* and generate a pre-processed image 901 as shown in FIG. 9. The processor(s) then merges the pre-processed image 901 with the inspection image 902 generated by the second detector 108 to generate the merged image 903. In some embodiments, each of the inspection images generated by the inspection tool 110 shown in FIG. 5B may have a contribution rate of 0.25 for the pre-processed image 901, the pre-processed image 901 have a contribution rate of 1.0 in the merged image 903, and the inspection image 902 may have a contribution rate of 0.6 in the merged image 903. Therefore, it is viable to improve accuracy of defect detection using the combination of the first detectors 106*a*, 106*b*, 106*c*, and 106*d* and second detector 108.

The review tool 120 including one or more processors may perform image enhancement on the merged image 903 to optimize the bright/dark contrast of the merged image 903. For example, a brightness-adjusting operation is performed on the merged image 903. In some embodiments, the brightness-adjusting operation may reduce brightness of the merged image 903 to form a relatively dark image, such as a first enhanced image 904 shown in FIG. 9.

In addition, an image-filtering operation may be optionally performed on the first enhanced image 904 to generate a second enhanced image 905 with noise suppression. In some embodiment, the noise in the second enhanced image 905 may be suppressed as the contrast is made greater, and the sharpness level of the line-and-space pattern is increased.

After the image-processing step, a processed image is generated. Generally, the third enhanced image 804 or the second enhanced image 905 with noise suppression is selected as the processed image. However, if the second enhanced image 803 includes a clear and sharp contact-hole pattern, it may be selected as the processed image, and the first enhanced image 904 may be selected as the processed image as it includes a clear and sharp line-and-space pattern.

At block 306, it is determined whether the processed image is qualified. The processed image is determined as a qualified image if it satisfies a quality requirement. In some embodiments, the processed image is compared with a reference image. The reference image may be generated from another wafer image of the same wafer (die-to-die) or from the design database (die-to-database) by simulating a wafer fabrication and inspection process on the design patterns. In some embodiments, the reference image may be a physical layout that represents the desirable pattern. In some embodiments, the desirable pattern includes lines with relatively straight edges and bends with relatively sharp angles. The actual printed pattern, however, may exhibit lines that have rough edges and bends that have corner rounding effects.

Figure 10:
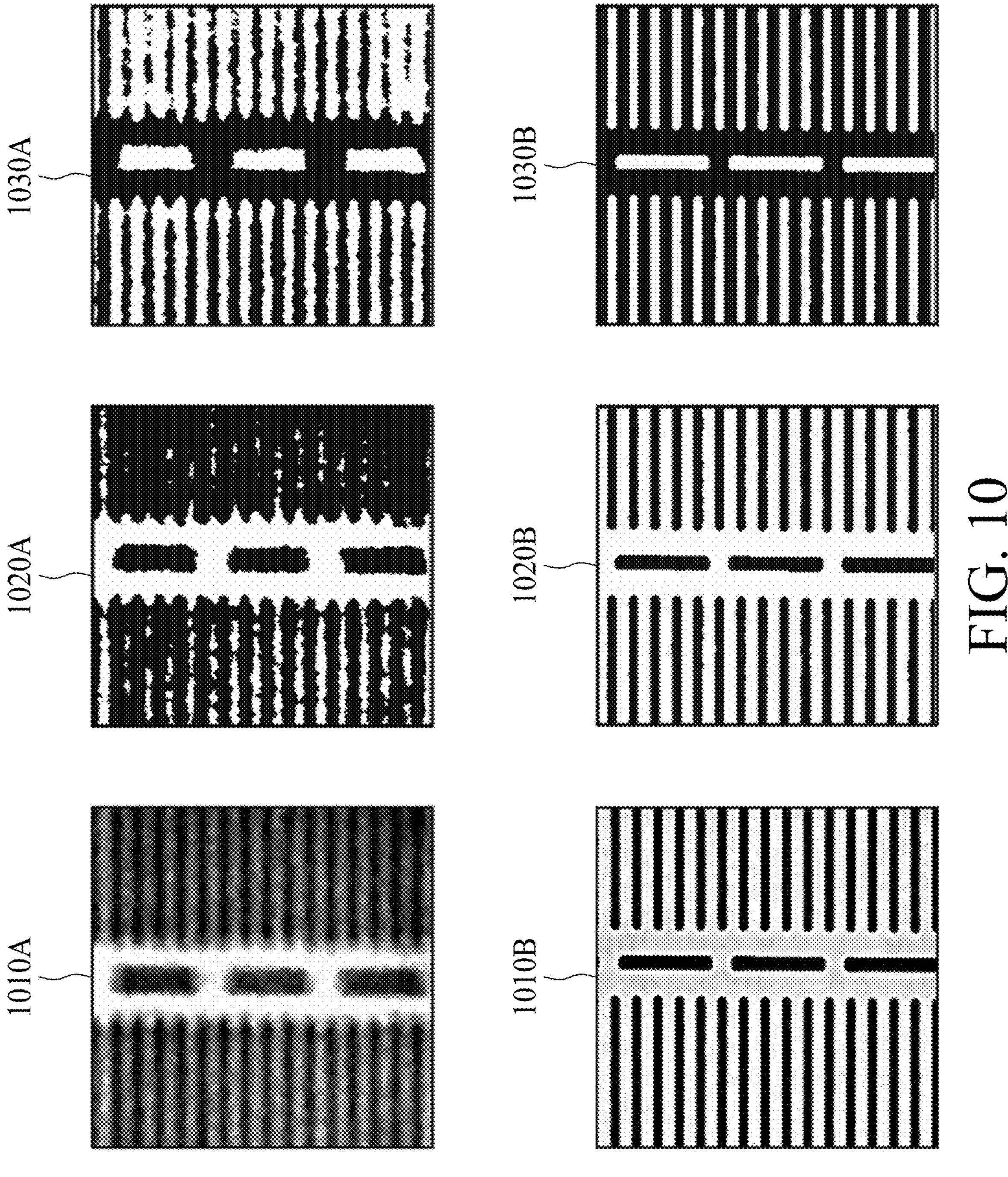
FIG. 10 depicts a processed image, a reference image, a first post-processed image, a second post-processed image, a third post-processed image, and a fourth post-processed image in accordance with some embodiments of the present disclosure.

In some embodiments, the processed image may be qualified according to a first blur degree of the processed image and a second blur degree of the reference image. As shown in FIG. 10, the processed image 1010A and the reference image 1010B include the bright portions and dark portions. In order to calculate the blur degree, the processor(s) in the review tool 120 is configured to adjust the brightness of the processed image 1010A and the reference image 1010B. For example, the processor(s) is configured to maximize the bright-to-dark ratios of the processed image 1010A and the reference image 1010B to generate a first post-processed image 1020A and a second post-processed image 1020B, respectively. In addition, a reversal operation is conducted by the review tool 120 to make bright portions of the first post-processed images 1020A and 1020B into dark portions, and to make dark portions of the images 1020A and the second post-processed image 1020B into bright portions. Consequently, a third post-processed image 1030A and a post-processed image 1030B are generated.

The processor(s) in the server 140 then calculates a first blur degree of the processed image 1010A and a second blur degree of the reference image 1010B. The first blur degree is determined as a ratio of the bright portions in the first post-processed image 1020A to the dark portions of the third post-processed image 1030A, and the second blur degree is determined as a ratio of the bright portions in the second post-processed image 1020B to the dark portions of the fourth post-processed image 1030B. The processor(s) in the server 140 further calculates a difference (blur index) between the first and second blur degrees to determine whether the processed image 1010A is qualified. For example, if the difference between the first and second blur degrees is less than a first predetermined threshold, the processed image is determined to be qualified. In contrast, if the difference between the first and second blur degrees is greater than or equal to the first predetermined threshold, the processed image is regarded as blurry and is determined to be unqualified.

Figure 11:
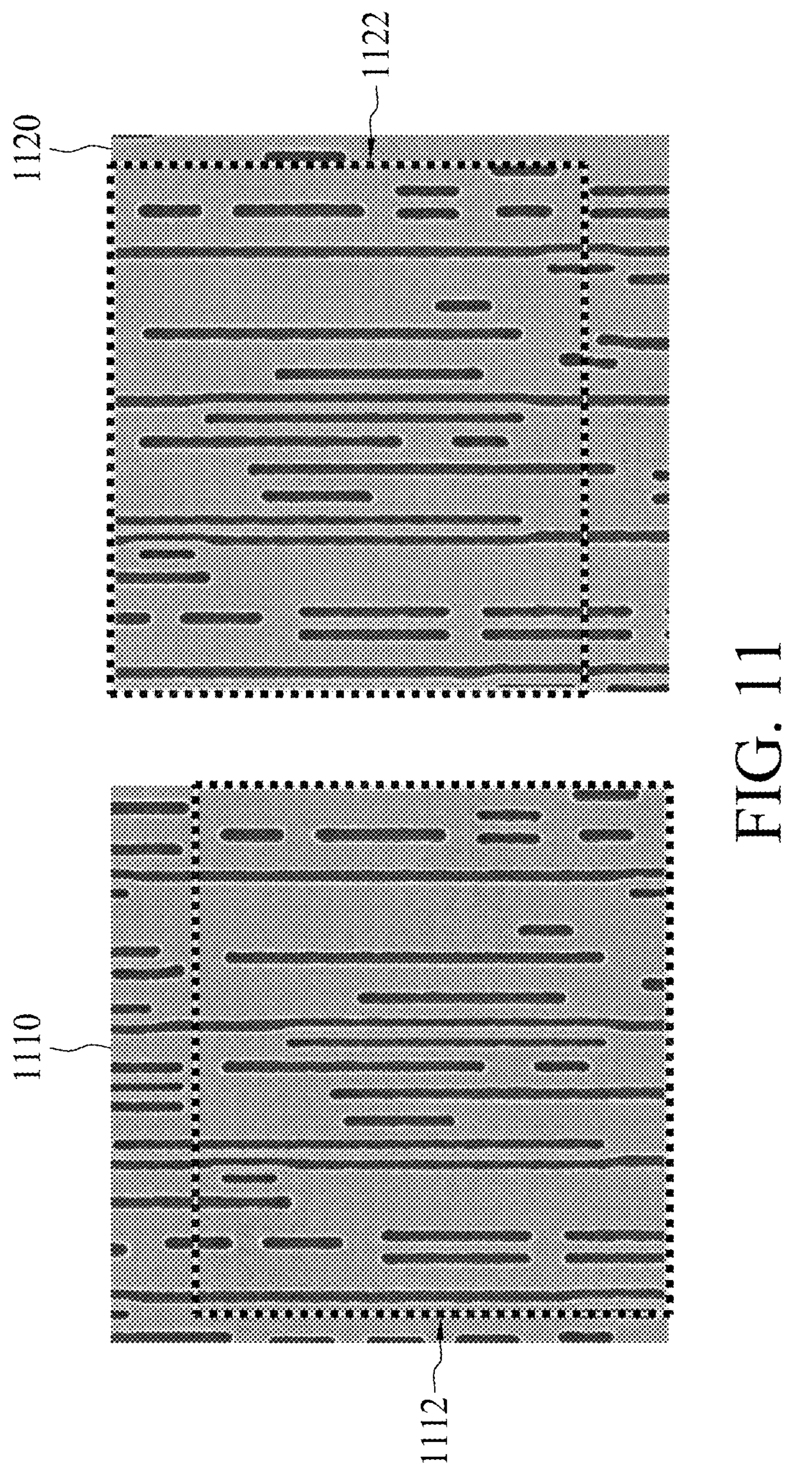
FIG. 11 depicts a processed image and a reference image with matching block in accordance with some embodiments of the present disclosure.

In some embodiments, it is determined whether the processed image is qualified by determining whether the processed image matches the reference image. As shown in FIG. 11, the processed image 1110 has a first matching block 1112 and the reference image 1120 has a second matching block 1122, wherein the first and second matching block 1112 and 1122 includes identical patterns. The processor(s) in the server 140 may calculate a matching ratio of an area of the first matching block 1112 in the processed image 1110 to a total area of the processed image 1110 to determine whether the processed image 1110 is qualified. If the matching ratio is greater than a second predetermined threshold, the processed image 1110 is determined to be qualified; otherwise, if the matching ratio is less than the second predetermined threshold, the processed image 1110 is determined to be unqualified.

Figure 12:
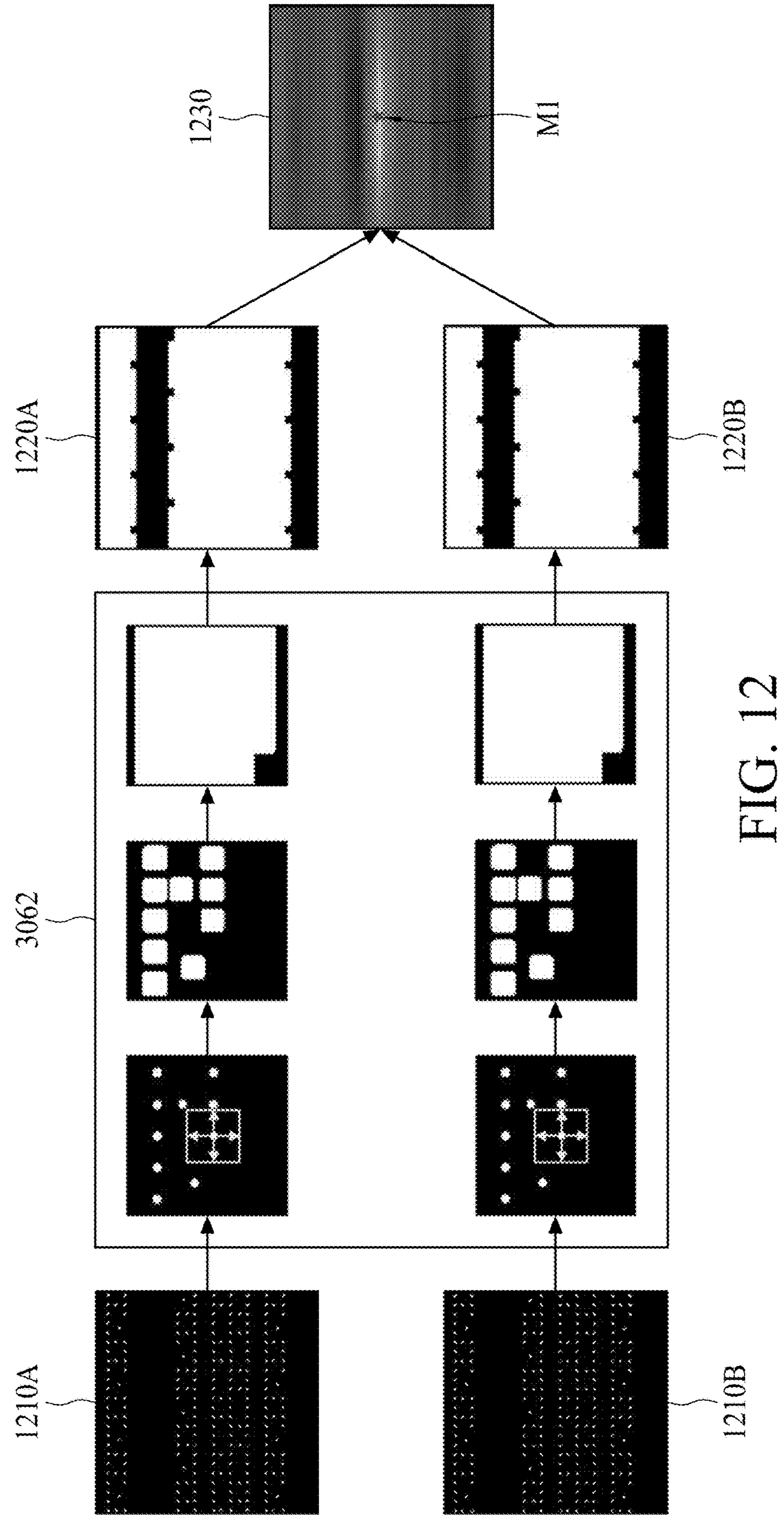
FIG. 12 depicts a coarse alignment operation for a processed image and a reference image in accordance with some embodiments of the present disclosure.

The matching block is found using the processor(s) in the server 140. In some embodiments, the processor(s) is configured to perform coarse alignment and fine alignment on both of the processed image and the reference image. The coarse alignment is used for determining at least one alignment offset between the processed image and the reference image. For example, the processor(s) performs an expanding operation 3062 on the processed image 1210A and the reference image 1210B shown in FIG. 12, wherein the processed image 1210A and the reference image 1210B having the contact-hole pattern. Therefore, the expending operation may be performed on expand each feature (i.e., contact hole) until adjacent features are connected. After the expending operation an expanded processed image 1220A and an expanded reference image 1220B are formed. The processor(s) in the server 140 is configured with particular accessibility for enabling cross-correlation calculations to determine the alignment offset. In some embodiments, the processor(s) may apply a cross-correlation algorithm to the expanded processed image 1220A and the expanded reference image 1220B to result in a correlation plot 1230. The correlation plot 1230 includes a maximum value M1, for example a normalized maximum value corresponding to the matched point of interest. The location of the maximum value M1 determines the alignment offset between the processed image 1210A and the reference image 1210B. In some embodiments, the cross-correlation algorithm includes cross-correlation operations in the Fourier domain. The fast Fourier transform (FFT) based technology is computationally efficient especially when the data size is large.

Figure 13:
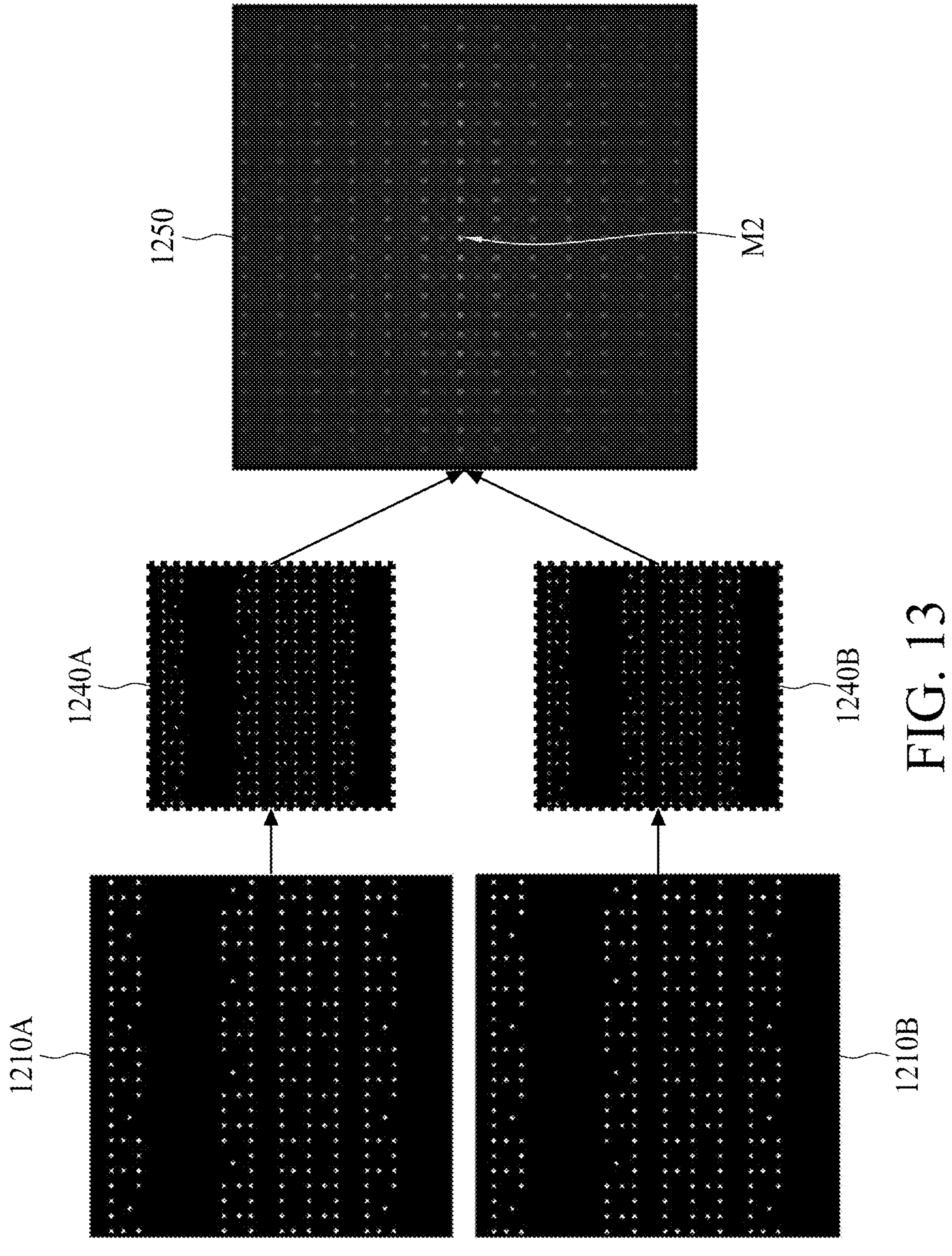
FIG. 13 depicts a fine alignment operation for a processed image and a reference image in accordance with some embodiments of the present disclosure.

The fine alignment is used to search for the matching block. After the alignment offset is obtained, the processor(s) in the server 140 may crop a portion of the processed image 1210A and a portion of the reference image 1220A to generate a first cropped image 1240A and a second cropped image 1240B, respectively, as shown in FIG. 13. The first and second cropped images 1240A and 1240B are cropped based on the alignment offset. Therefore, the cropped images 1240A and 1240B are considered to have substantially the same patterns. Thereafter, the processor(s) in the server 140 may apply a cross-correlation algorithm to the first and second cropped image 1240A and the 1240B to generate a correlation plot 1250. The correlation image 1250 comprises a maximum value M2 corresponding to the matched point of interest. The location of the maximum value M2 determines the alignment offset for the processed image 1210A and the reference image 1210B. In some embodiments, the matching offset is calculated in the unit of pixels of the processed image or the reference image. The index of the matching offset may correspond to the index of the peak value in the FFT spectrum.

Referring to FIG. 6; at block 308, the qualified image is classified. The qualified image is classified for analyzing (block 310). In some embodiments, the qualified image and the reference image are classified as the image of the contact-hole pattern or the image of the line-and-space pattern.

After the classification, the processor(s) in the server 140 may conduct an edge detection (block 3112) and a measurement (block 3114) on the qualified image and reference image of the line-and-space pattern, while the processor(s) may only conduct a calculation (block 3116) operation on the qualified image and the reference image of the contact-hole pattern.

Figure 14:
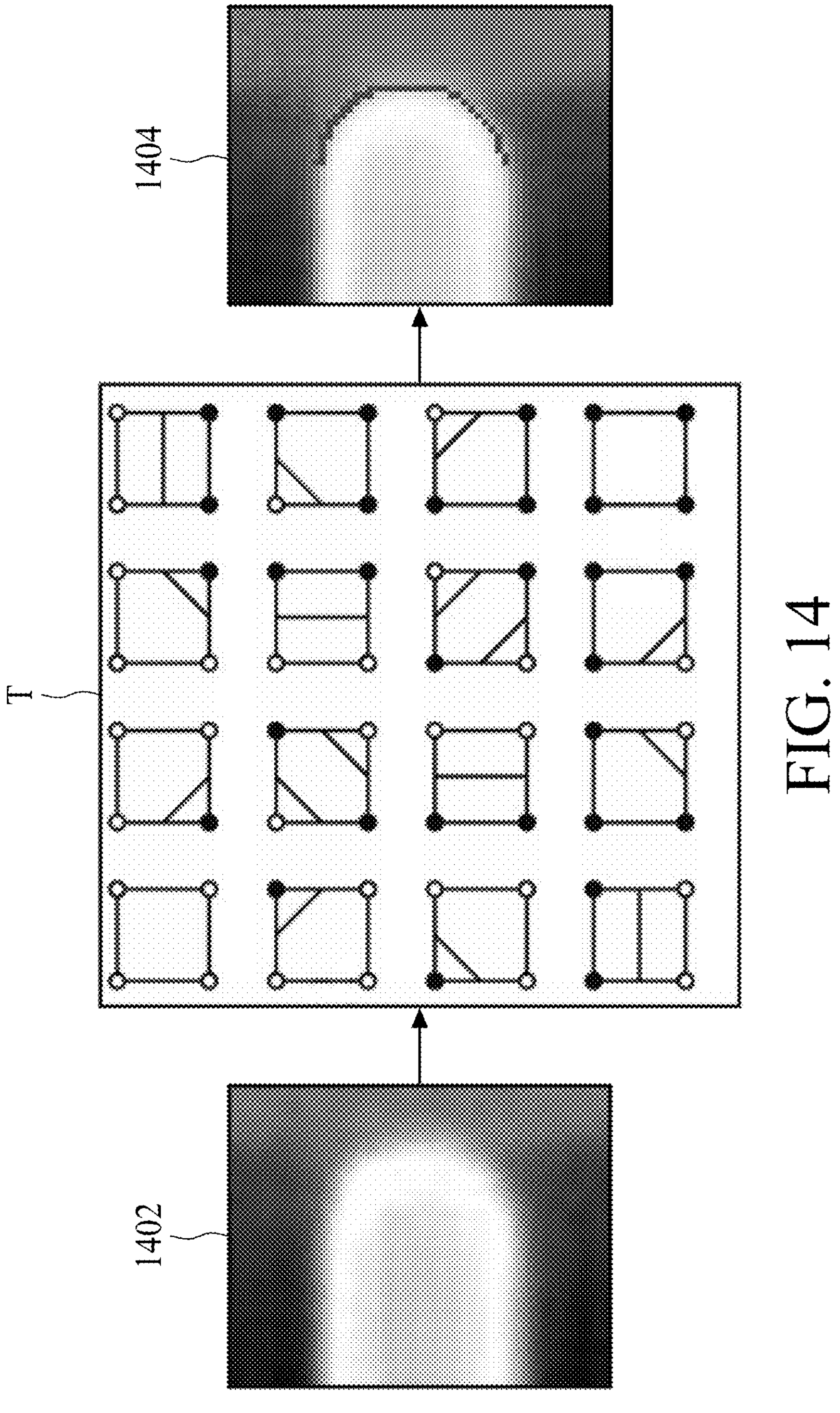
FIG. 14 depicts an edge detection operation for a region of interest in accordance with some embodiments of the present disclosure.

Referring to FIGS. 6 and 14; at block 3112, the edge detection includes determining a region of interest (ROI) 1402 in the qualified image and finding edges of the lines in the ROI 1402 using a marching square algorithm. In some embodiments, the ROI 1402 may include one or more lines having edges. The set of corner contours can be obtained from a look-up table T. The look-up table T lists the shapes for each type of corner contours. After block 3112, a modified image 1404 is generated, wherein each edge of the line(s) shown in the modified image 1404 is illustrated using the contours of the look-up table T.

Figure 15:
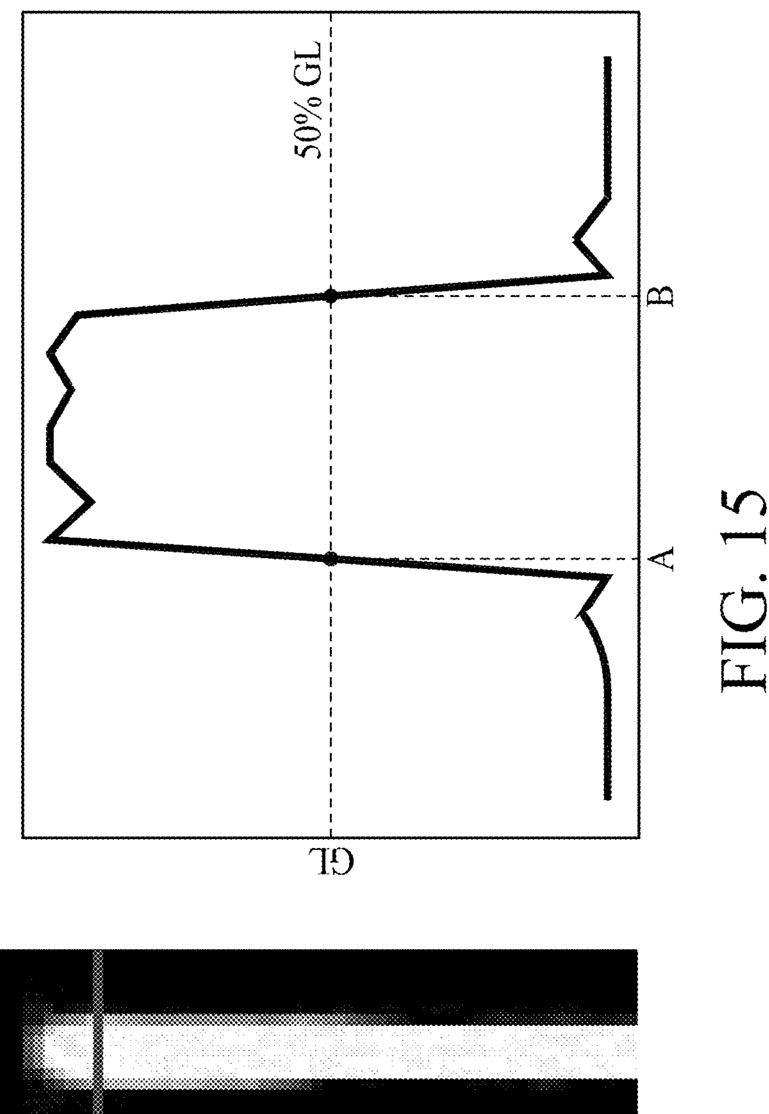
FIG. 15 depicts FWHM-based operation for a line-and-space pattern in accordance with some embodiments of the present disclosure.

Referring to FIGS. 6 and 15; at block 3114, a measurement to measure a critical dimension (CD) of the line in the processed image 1404 is performed. In some embodiments, the full width at the half maximum (FWHM) amplitude is determined as the CD of the line in the ROI according the half value of its maximum (brightness) amplitude. As shown in FIG. 15, a curve representing the brightness distribution of the line in the ROI is depicted, and the right and left edge positions are coincided with the half of the maximum brightness value. The distance between the right and left edge positions are determined as the CD of the line in ROI.

Generally, the generated qualified image is not a binary image. At block 3116, the processor(s) in the server 140 is configured to conduct a binarization (bi-level transformation) operation on the qualified image to generate a modified image, calculating an area of each contact hole in the modified image based on the pixel counts occupied by each contact hole.

Figure 16:
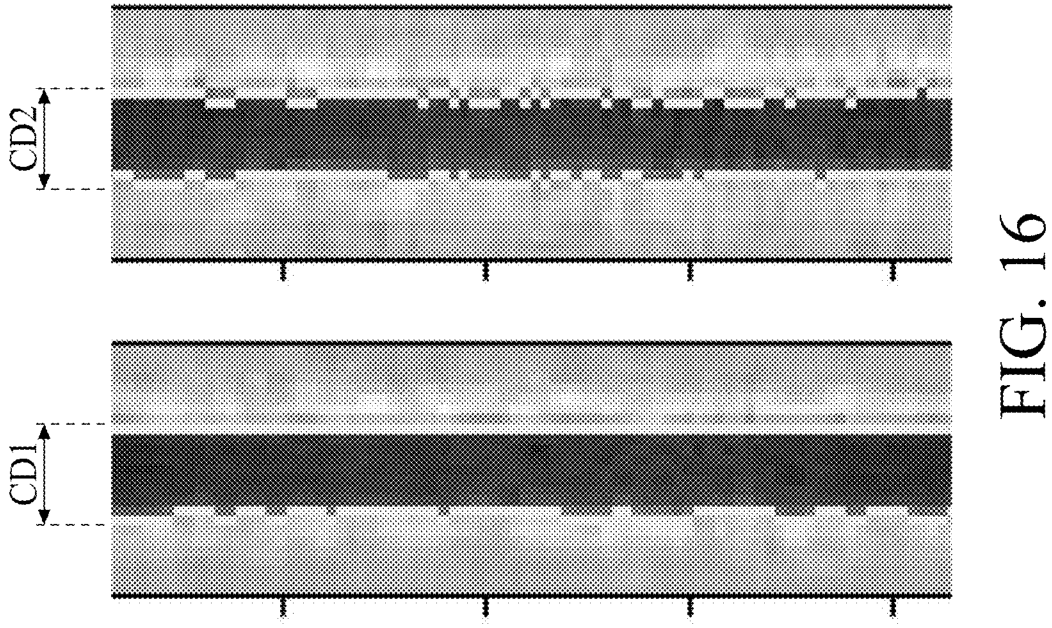
FIG. 16 is a schematic diagram illustrating a comparison of a reference image and a qualified image in accordance with some embodiments of the present disclosure.

After the analyzing of the qualified image, the method 300 then proceeds to block 312, in which a comparison operation is performed. For example, when the qualified image and the reference image includes the line-and-space pattern, during the comparison operation, the processor(s) in the server 140 is configured to compare the critical dimension CD1 (as shown in FIG. 16) of the line in the qualified image with the critical dimension CD2 of the line in the reference image. After the comparison, if the difference is equal to or greater than a third predetermined threshold, then the feature in the qualified image is identified as a defect. Then, the method 300 proceeds to block 314 to report the defect. In contrast, if a difference between the critical dimensions of the lines in the qualified image and the reference image is less than the third predetermined threshold, the feature in the qualified image is not identified as a defect.

Figure 17:
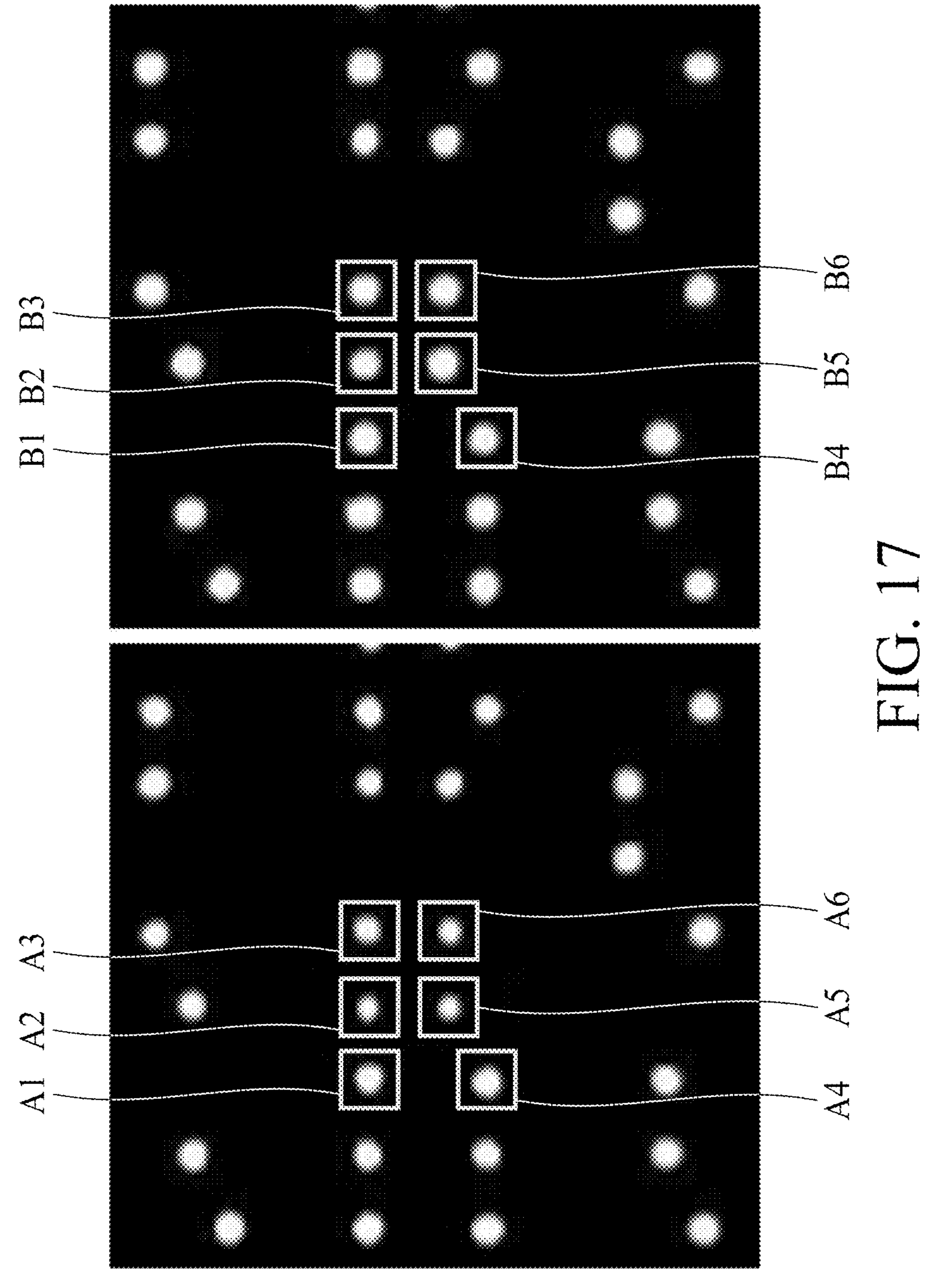
FIG. 17 is a schematic diagram illustrating a comparison of a reference image and a qualified image in accordance with some embodiments of the present disclosure.

When the qualified image and the reference image include the contact hole pattern, the processor(s) is configured to compare areas of some holes in the qualified image and the reference image. After the comparison is completed, the processor(s) may generate a report. As shown in FIG. 17, the qualified image includes contact holes A1 to A6, wherein the contact hole A1 has an area of 224 square nanometers, the contact hole A2 has an area of 151 square nanometers, the contact hole A3 has an area of 200 square nanometers, the contact hole A4 has an area of 257 square nanometers, the contact hole A5 has an area of 151 square nanometers, and the contact hole A6 has an area of 175 square nanometers. The reference image include contact holes B1 to B6, wherein the contact hole B1 has an area of 287 square nanometers, the contact hole B2 has an area of 263 square nanometers, the contact hole B3 has an area of 267 square nanometers, the contact hole B4 has an area of 253 square nanometers, the contact hole B5 has an area of 311 square nanometers, and the contact hole B6 has an area of 282 square nanometers. The difference between the areas of the contact holes A1 and B1 is substantially equal to that of the contact holes A3 and B3/A4 and B4/A6 and B6; however, the difference between the areas of the contact holes A2 and B2/A4 and B4 are far greater than the of the areas of the contact holes A1 and B1. Therefore, the contact holes A2 and A4 may be determined as defects.

The systematic filter process can be configured to automatically analyze defect data as it is received by comparing one or more defects to previously received defects so as to determine whether patterns of similar defects are detected by grouping such matching defects together. After substantially all of the detected defect data for a particular wafer or reticle are found and grouped (if matching), the filter process can then automatically filter the systematic defects from the detected data. After the systematic defects are filtered from all the detected defects, the filtered defects may then be reviewed. For example, the filtered defects may be reviewed to determine whether the remaining defects exist, which defects critically affect the operation of the fabricated device structures that are to be fabricated with the reticle.

Figure 18:
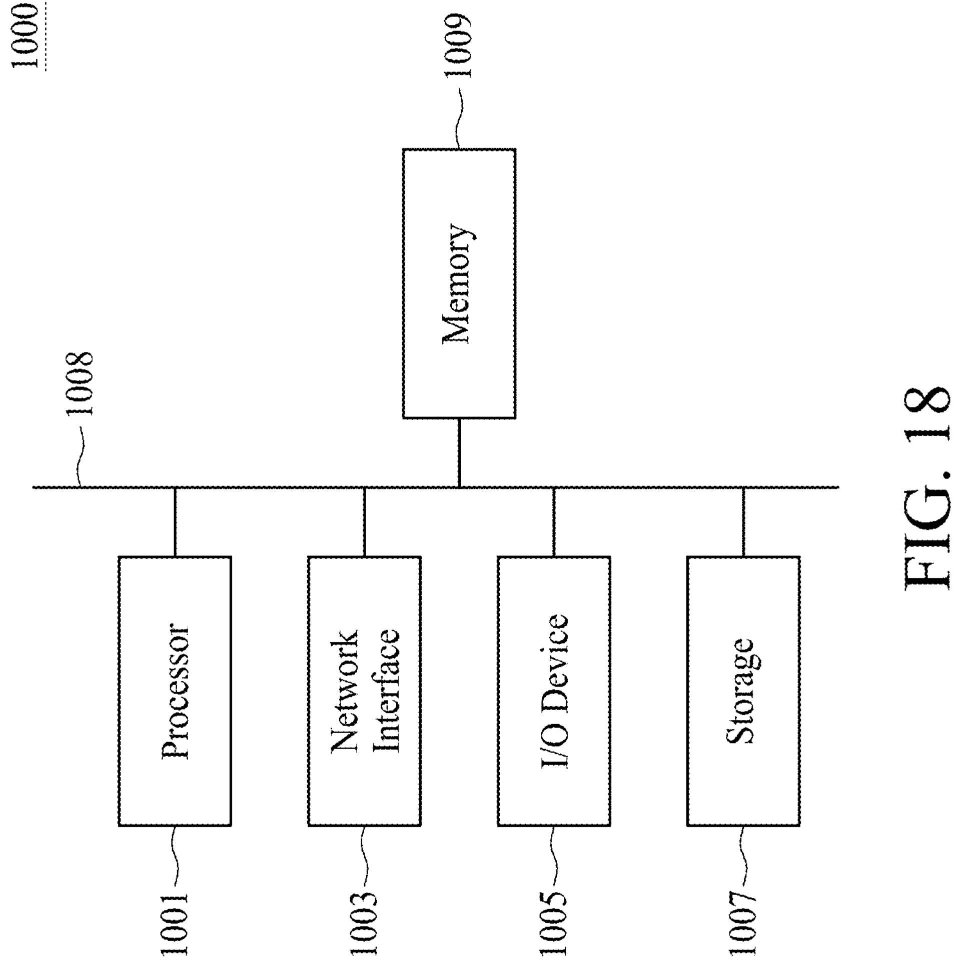
FIG. 18 is a block diagram illustrating a non-transitory computer-readable medium storing program instructions for causing a computer system to perform a computer-implemented method in accordance with some embodiments of the present disclosure.

FIG. 18 is a schematic diagram of a system 1000 for implementing the defect detection methods discussed above, in accordance with some embodiments. The system 1000 includes one or more processors 1001, a network interface 1003, an input and output (I/O) device 1005, a storage device 1007, a memory 1009, and a bus 1008. The bus 1008 couples the processor(s) 1001, the network interface 1003, the I/O device 1005, the storage device 1007 and the memory 1009 to each other.

The processor(s) 1001 is/are configured to execute program instructions that include a tool configured to perform the method as described and illustrated with reference to figures of the present disclosure. Accordingly, the tool is configured to execute steps, such as processing images, qualifying images, extracting features from images, measuring one or more dimension(s) of a specified feature in images, and identifying defect.

The network interface 1003 is configured to access program instructions and data accessed by the program instructions stored remotely through a network (not shown).

The I/O device 1005 includes an input device and an output device configured for enabling user interaction with the system 1000. In some embodiments, the input device includes, for example, a keyboard, a mouse, and other devices. Moreover, the output device includes, for example, a display, a printer, and other devices.

The storage device 1007 is configured for storing program instructions and data accessed by the program instructions. In some embodiments, the storage device 1007 includes a non-transitory computer-readable storage medium, for example, a magnetic disk and an optical disk.

The memory 1009 is configured to store program instructions to be executed by the processor(s) 1001 and data accessed by the program instructions. In some embodiments, the memory 1009 includes any combination of a random access memory (RAM), some other volatile storage device, a read-only memory (ROM), and some other non-volatile storage device.

In accordance with some embodiments of the present disclosure, a defect inspection method is provided, wherein the defect inspection method includes providing a processed image and a reference image of a wafer, both the processed image and the reference image comprising a pattern of interest; determining the processed image as a qualified image in response to a matching ratio that reflects a percentage of correctly aligned features of the pattern of interest between the processed image and the reference image is above a first predetermined threshold; selecting a first feature of the qualified image; selecting a second feature of the reference image corresponding to the first feature of the processed image; comparing the qualified image with the reference image to determine a variation of the first feature with respect to the second feature; and detecting a defect of the wafer based on a comparison of the first and second features.

In accordance with some embodiments of the present disclosure, an inspection system is provided, wherein the inspection system includes an energy source, a plurality first detectors, and a processor. The energy source is configured to cause an energy beam to be directed to a wafer. The plurality first detectors are configured to detect the energy beam scattered from the wafer and to generate a plurality of inspection images in response to the detected energy beam, wherein the plurality of first detectors are positioned at different azimuthal angles. The processor is electrically coupled to the plurality of first detector and configured to: merge the plurality of inspection images to generate a merged image; enhance quality of the merged image to generate a processed image; determine whether the processed image is qualified using a reference image; and find defects of a qualified image in response to determining that the processed image is qualified.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

providing a processed image and a reference image of a wafer, both the processed image and the reference image comprising a pattern of interest;

determining the processed image as a qualified image in response to a matching ratio that reflects a percentage of correctly aligned features of the pattern of interest between the processed image and the reference image is above a first predetermined threshold;

selecting a first feature of the qualified image;

selecting a second feature of the reference image corresponding to the first feature of the qualified image;

comparing the qualified image with the reference image to determine a variation of the first feature with respect to the second feature; and detecting a defect of the wafer based on a comparison of the first and second features, wherein if the pattern of interest comprises a line-and-space pattern, the providing of the processed image comprises:

acquiring a plurality of first inspection images and a second inspection image associated with the pattern of interest, wherein the first inspection images are captured from different azimuthal angles, and each of the first inspection images and the second inspection image are captured from different elevation angles with respect to the wafer;

merging the first inspection images and the second inspection image to generate a first merged image; and performing a first brightness-adjusting operation and a first image-filtering operation on the first merged image to provide the processed image.

2. The method of claim 1, wherein the determining of the processed image as the qualified image comprises:

performing a coarse alignment to determine at least one alignment offset between the pattern of interest of the reference image and the pattern of interest of the processed image;

performing a fine alignment to search for a matching block of the processed image using the at least one alignment offset determined by the coarse alignment;

obtaining the matching ratio of an area of the matching block to an area of the processed image; and determining whether the processed image is the qualified image based on a comparison between the matching ratio and the first predetermined threshold.

3. The method of claim 2, wherein the coarse alignment comprises:

expanding the pattern of interest in the processed image to generate an expanded processed image;

expanding the pattern of interest in the reference image to generate an expanded reference image; and matching a pattern in the expanded processed image to a pattern in the expanded reference image to determine the at least one alignment offset.

4. The method of claim 1, wherein the processed image is identified as the qualified image when the matching ratio is above the first predetermined threshold and a blur index that reflects a blur degree of the processed image is below a second predetermined threshold, and the blur index is obtained by:

maximizing a bright-to-dark ratio of the reference image and the processed image to generate a first image and a second image, respectively;

performing a reversing operation on the first image and the second image to generate a third image and a fourth image, respectively;

calculating a first ratio of at least one bright region of the first image to at least one dark region of the third image;

calculating a second ratio of at least one bright region of the second image to at least one dark region of the fourth image; and obtaining the blur index by calculating a difference between the first and second ratios.

5. The method of claim 4, wherein the method is terminated when the matching ratio is equal to or below the first predetermined threshold and the blur index is equal to or above the second predetermined threshold.

6. The method of claim 1, wherein if the pattern comprises a contact-hole pattern, the acquiring of the processed image comprises:

acquiring inspection images of the pattern of interest from different azimuthal angles at a same height;

generating a second merged image of the pattern of interest by aligning and merging the inspection images; and performing a quality-enhancing operation on the second merged image to generate the processed image.

7. The method of claim 6, wherein the quality-enhancing operation comprises:

performing a contrast-reversing operation on the second merged image;

performing a second brightness-adjusting operation on the second merged image subsequent to the contrast-reversal operation; and performing a second image-filtering operation on the second merged image after the second brightness-adjusting operation to generate the processed image.

8. The method of claim 1, wherein the second inspection image is captured from an elevation angle of about 90 degrees.

9. The method of claim 1, wherein each of the first inspection images has a contribution rate of 1.0 in the first merged image, and the second inspection image has a contribution rate of 0.6 in the first merged image.

10. The method of claim 1, further comprising determining the defect as systematic random defects or random defects.

11. A system, comprising:

an energy source configured to cause an energy beam to be directed to a wafer;

a plurality of first detectors configured to detect the energy beam scattered from the wafer and to generate a plurality of inspection images in response to the detected energy beam, wherein the plurality of first detectors are positioned at different azimuthal angles; and a processor electrically coupled to the plurality of first detector and configured to:

merge the plurality of inspection images to generate a merged image;

enhance quality of the merged image to generate a processed image;

determine whether the processed image is qualified using a reference image; and find defects of a qualified image in response to determining that the processed image is qualified, wherein if the processed image comprises a contact-hole pattern, the plurality of first detectors are further configured to generate the plurality of inspection images from different azimuthal angles at a same height; and the processor is further configured to:

generate the merged image by aligning and merging the plurality of inspection images.

12. The system of claim 11, wherein the processor is configured to determine the processed image as a qualified image when a matching ratio that reflects a percentage of correctly aligned features between the processed image and the reference image is above a second predetermined threshold.

13. The system of claim 11, wherein the reference image is generated by the plurality of first detectors and is processed by the processor.

14. The system of claim 11, further comprising a second detector coupled to the processor and configured to generate a second inspection image, wherein the first and second detectors are arranged at different evaluation angles with respect to the wafer.

15. A non-transitory computer-readable storage medium, comprising instructions which, when executed by a processor, perform steps of:

receiving a plurality of first inspection images comprising a pattern of interest formed on a wafer;

merging the first inspection images to generate a merged image;

performing a quality-enhancing operation on the merged image to generate a processed image;

determining the processed image as a qualified image when a matching ratio that reflects a fraction of correctly aligned features between the processed image and a reference image is above a first predetermined threshold;

selecting a first feature within the qualified image;

selecting a second feature within the reference image corresponding to the first feature of the qualified image;

comparing the qualified image with the reference image to determine a variation in the first feature with respect to the second feature; and detecting a defect on the wafer based on the comparing of the first and second features.

16. The non-transitory computer-readable storage medium of claim 15, wherein the determining of the processed image as the qualified image comprises:

performing a coarse alignment to determine at least one alignment offset between the pattern of interest of the reference image and the pattern of interest of the processed image;

performing a fine alignment to search for a matching block of the processed image using the at least one alignment offset determined by the coarse alignment;

obtaining the matching ratio of an area of the matching block to an area of the processed image; and determining whether the processed image is the qualified image based on a comparison between the matching ratio and the first predetermined threshold.

17. The non-transitory computer-readable storage medium of claim 16, wherein the coarse alignment comprises:

expanding the pattern of interest in the processed image to generated an expanded processed image;

expanding the pattern of interest in the reference image to generate an expanded reference image; and matching a pattern in the expanded processed image to a pattern in the expanded reference image to determine the alignment offset.

18. The non-transitory computer-readable storage medium of claim 15, wherein the processed image is identified as the qualified image when the matching ratio is above the first predetermined threshold and a blur index that reflects a blur degree of the processed image is below a second predetermined threshold, and the blur index is obtained by:

maximizing a bright-to-dark ratio of the reference image and the processed image to generate a first image and a second image, respectively;

performing a reversing operation on the first image and the second image to generate a third image and a fourth image, respectively;

calculating a first ratio of at least one bright region of the first image to at least one dark region of the third image;

calculating a second ratio of at least one bright region of the second image to at least one dark region of the fourth image; and obtaining the blur index by calculating a difference between the first and second ratios.

19. The non-transitory computer-readable storage medium of claim 18, wherein the executing is terminated when the matching ratio is equal to or below the first predetermined threshold and the blur index is equal to or above the second predetermined threshold.

20. The non-transitory computer-readable storage medium of claim 15, further comprising determining the defect as systematic random defects or random defects.

* * * * *